(12) United States Patent
Choi et al.

(10) Patent No.: US 7,038,335 B2
(45) Date of Patent: May 2, 2006

(54) VERTICAL VIBRATOR

(75) Inventors: Joon Choi, Suwon (KR); Il Oung Park, Seoul (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 0 days.

(21) Appl. No.: 11/148,200

(22) Filed: Jun. 9, 2005

(65) Prior Publication Data

US 2005/0285454 A1    Dec. 29, 2005

(30) Foreign Application Priority Data

Jun. 23, 2004  (KR) .................... 10-2004-0047255
Jun. 1, 2005   (KR) .................... 10-2005-0046622

(51) Int. Cl.
- *H02K 1/06* (2006.01)
- *H02K 1/34* (2006.01)
- *H02K 5/10* (2006.01)
- *H02K 33/02* (2006.01)

(52) U.S. Cl. .................... 310/12; 310/17; 340/407.1; 381/417

(58) Field of Classification Search ................ 310/12, 310/13, 14, 15, 16, 17, 18, 19, 20, 36, 38, 310/81; 340/407.1; 381/417
See application file for complete search history.

(56) References Cited

U.S. PATENT DOCUMENTS

| 4,931,765 A | * | 6/1990 | Rollins et al. ............ 340/407.1 |
| 5,184,037 A | * | 2/1993 | Kobayashi et al. ............ 310/26 |
| 5,903,076 A | * | 5/1999 | Suyama ...................... 310/81 |
| 6,492,899 B1 | * | 12/2002 | Yamaguchi .............. 340/407.1 |
| 6,608,541 B1 | * | 8/2003 | Shiraki et al. .............. 335/222 |
| 6,777,895 B1 | * | 8/2004 | Shimoda et al. ............ 318/114 |
| 6,806,603 B1 | * | 10/2004 | Choi et al. ..................... 310/81 |

* cited by examiner

*Primary Examiner*—Darren Schuberg
*Assistant Examiner*—David W. Scheuermann
(74) *Attorney, Agent, or Firm*—Lowe Hauptman & Berner, LLP (57) ABSTRACT

A vertical vibrator is disclosed. The vibrator comprises a casing, a magnetic field part including a yoke and a magnet fixed to an inner surface of the yoke, a spring member fixed at one end to the casing and at the other end to the magnetic field part, a vibration part having a weight integrally mounted to the magnetic field part and vibrating together with the magnetic field part through the spring member, a vibration coil located below the magnetic field part for generating an electric field, and a magnetic fluid applied to an upper surface of the spring member corresponding to the magnet and fixed in position by a magnetic flux. The vibrator absorbs contact noise and impact caused by contact between the vibration part and the other members while ensuring convenient and appropriate positioning of the magnetic fluid, thereby having an extended life span.

38 Claims, 10 Drawing Sheets

PRIOR ART

FIG. 1

PRIOR ART

FIG. 2

PRIOR ART

VERTICAL VIBRATOR

RELATED APPLICATION

The present invention is based on, and claims priority from, Korean Patent Application Number 2004-47255, filed Jun. 23, 2004 and Korean Patent Application No. 2005-46622 filed Jun. 1, 2005, the disclosure of which is incorporated by reference herein in its entirety.

BACKGROUND OF THE INVENTION

1. Field of the Invention

The present invention generally relates to a vertical vibrator, and, more particularly, to a vertical vibrator, designed to achieve a stable vibration waveform by absorbing contact noise and impact caused by contact between a vibration part and an upper structure upon excessive upward vibration of the vibration part, to ensure convenient and appropriate positioning of magnetic fluid by use of the magnetic flux leaked from a yoke, and to have an extended life span by increasing coupling force between a magnet and the yoke.

2. Description of the Related Art

Communication instruments generally employ ring tones and vibration in order to notify call termination. Notification of the call termination using the vibration is generally performed in such a manner that driving force is generated by a small vibration motor, and is then transmitted to a casing of the instrument to vibrate the instrument.

The vibration motor, one of call termination-notifying means employed by current communication instruments, such as mobile phones, is a component which converts electric energy into mechanical energy by use of a principle of generating electromagnetic force, and is mounted on the mobile phone for the purpose of mute notification of call termination.

However, as a result of the rapid expansion of the mobile phone market together with the rapidly increasing diversity of mobile phone functions, there are requirements for miniaturization and high quality of components in the mobile phone, and under such circumstances, there is a need in the art to develop products employing a new structure capable of solving problems of conventional vibration motors while remarkably enhancing the quality of the conventional vibration motors.

Figure 1:
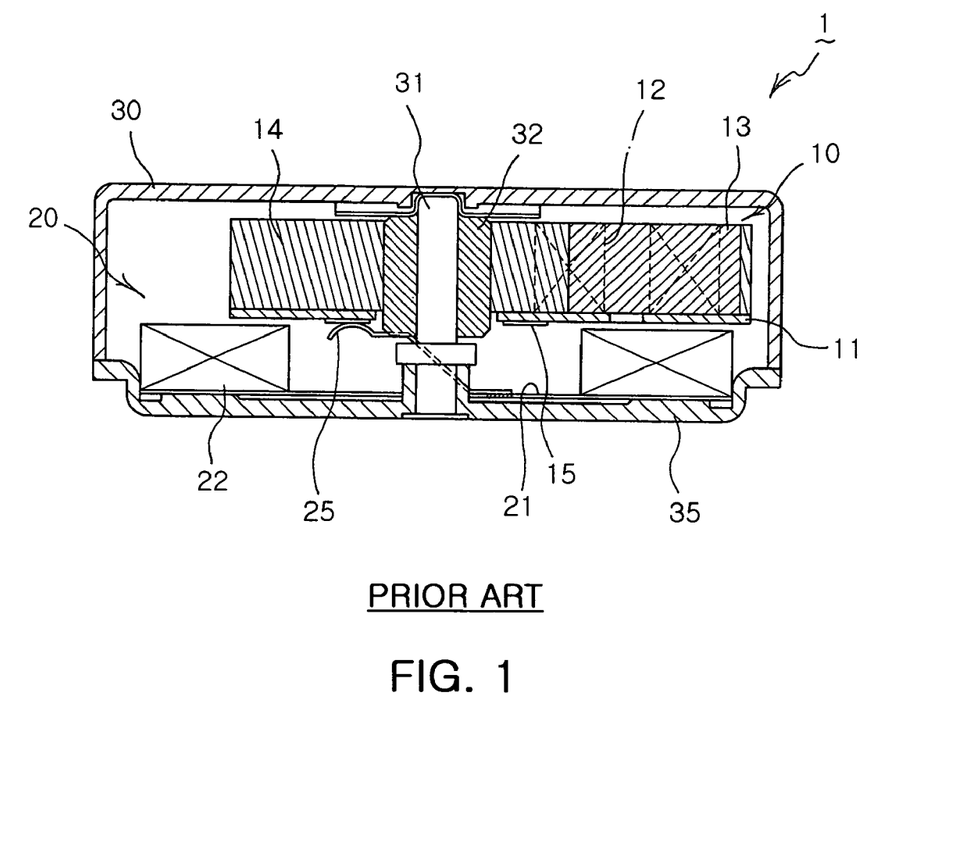
FIG. 1 is a cross-sectional view of a conventional flat-type vibration motor.

FIG. 1 is a cross-sectional view of a conventional vibration motor. As shown in FIG. 1, the conventional flat-type or coin-type vibration motor comprises a stator 20, a rotor 10 rotatably equipped around a shaft 31, and a housing 30 for receiving the rotor 10 and the stator 20.

When power is applied from an external power supply to a pair of brushes 25 mounted on a lower substrate 21 of the stator 20, oppositely polarized electric currents are induced within the pair of brushes 25. At this time, since upper ends of the brushes 25 resiliently contact a commutator 15 provided on a lower surface of an upper substrate 11 of the rotor 10, power is supplied to a wound coil 12 provided in the rotor 10 through the commutator 15 contacting the brushes 25.

Then, the rotor 10 rotates in one direction around the shaft 31 by virtue of interaction between an electric field caused by electric current induced to the wound coil 12 and a magnetic field caused by a magnet 22 provided to the stator 20.

At this time, a contact between the brushes 25 and segments of the commutator 15 contacting the brushes 25 is continuously changed every cycle of rotation of the rotor 10, causing the polarities of the power source to be continuously changed. As a result, while continuously rotating, the rotor 10 having an eccentrically disposed weight 13 induces the vibration, which notifies the call termination.

In FIG. 1, reference numeral 14 indicates an insulating material which surrounds the wound coil 12 and the weight 13, reference numeral 32 indicates a bearing member, and reference numeral 30 indicates a bracket closing an open lower portion of the housing 30.

The vibration motor 1 generates mechanical vibration by rotating the rotor 10 having the eccentrically disposed weight when power is supplied thereto, and rotational force of the rotor 10 is generated through operation of the commutator or brush structure as current is supplied to the wound coil of the rotor 10 after being rectified through the contact between the brushes 25 and the commutator 15.

However, when driving the motor having such a structure, the brushes 25 pass through a minute gap between segments of the commutator 15, generating mechanical friction, electrical sparks and abrasion therein, whereby foreign substances, such as black powders, are produced, and reduce the life span of the motor.

Accordingly, in order to overcome the disadvantages of the conventional commutator or brush-type vibration motor, a multi-functional actuator has been developed which induces sound and vertical vibration by use of resonance frequency of a vibrator.

Figure 2:
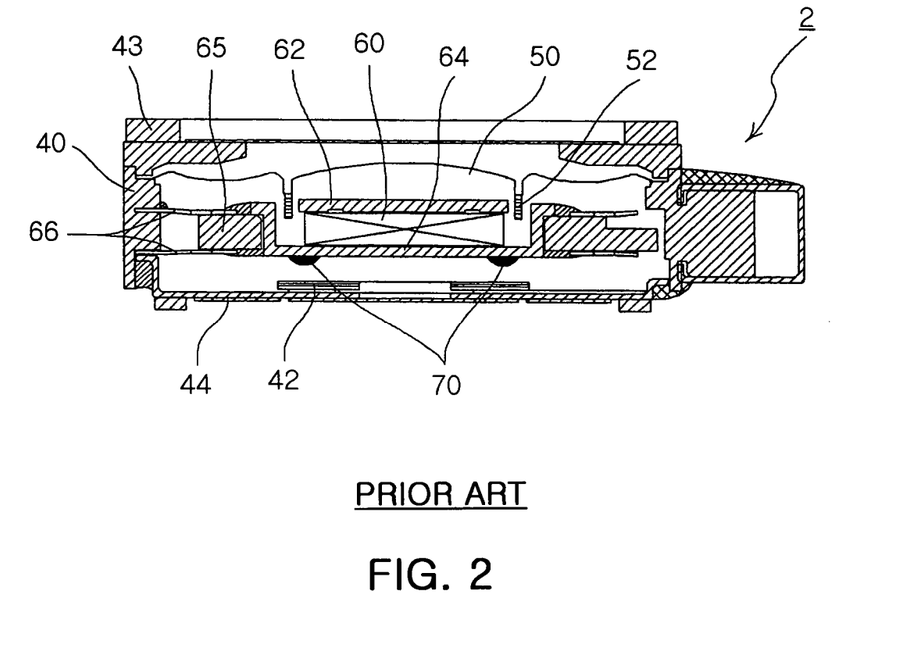
FIG. 2 is a cross-sectional view of a conventional multi-functional actuator.

FIG. 2 is a cross-sectional view of a conventional multi-functional actuator. As shown in FIG. 2, an actuator 2 comprises a body casing 40 having a space defined therein, a trembling plate 50 mounted to an upper portion of the body casing 40 and having a sound coil 52 mounted on a lower surface of the trembling plate 50 for generating sound to indicate call termination, a magnet 60 vertically magnetized to form a magnetic circuit with an upper plate 62 mounted on an upper surface of the magnet 60, the upper plate 62, a vibrating body constituted by a weight 65 and a yoke 64 for mounting the magnet 60, a plate spring 66 for resiliently supporting the vibrating body within the body casing 40, and a vibration coil 42 provided to a position directly below the vibrating body for generating vibration.

In FIG. 2, reference numeral 43 indicates an upper case for covering an upper portion of the body casing 40, and reference numeral 44 indicates a bracket for receiving the vibration coil 42.

The actuator 2 is adapted to selectively generate sound and vibration by supplying power from the external power supply to the sound coil 52 and the vibration coil 42 through a lead line (not shown). In the actuator 2, if power is supplied to the sound coil 52, the trembling plate 50 minutely trembles by virtue of an interaction between the magnetic field generated by a magnetic circuit constituted by the magnet 60, the upper plate 62 and the yoke 64, and the electric field generated by the sound coil 52, thereby producing sound.

Additionally, if power is supplied to the vibration coil 42, the vibrating body vertically vibrates by virtue of an interaction between magnetic field generated from the magnetic circuit constituted by the magnet 60, the upper plate 62 and the yoke 64, and electric field generated from the vibration coil 52, in which the vibration body comprising the magnet 60, the upper plate 62, the yoke 64 and the weight 65 is suspended in the body casing 40 via the plate spring 66.

At this time, the vibrating body is subjected to variation in magnitude of movement thereof according to intensity and frequency of the signal for generating the vibration, and if a vertical amplitude of the vibrating body is above a predetermined value, the vibrating body comes into contact with the sound coil 52 provided as an upper structure or the vibration coil 42 provided as a lower structure, thereby generating contact noise. Accordingly, as shown in FIG. 2, the yoke 64 is provided at a lower surface with a magnetic fluid 70 acting as a damper for absorbing impact upon contact between the vibrating body and the lower structure.

However, the conventional actuator 2 described above has a number of limitations due to the number of components and complicated construction thereof. Namely, miniaturization and simplification of the conventional actuator 2 are limited and manufacture thereof is costly.

Accordingly, in order to overcome the problems of the conventional actuator 2, a vertical vibrator 3 has been developed, which generates vertical vibration, and has a small number of components as well as a simple construction.

Figure 3:
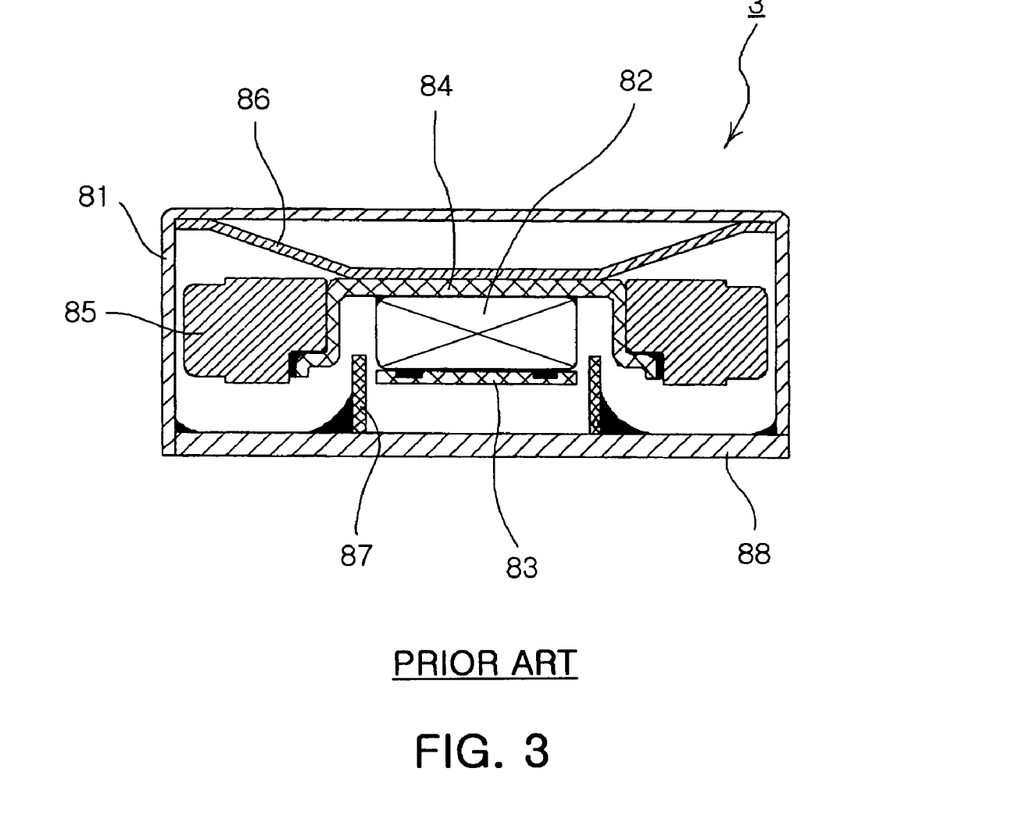
FIG. 3 is a cross-sectional view of a conventional vertical motor.

FIG. 3 is a cross-sectional view of a conventional vertical vibrator. As shown in FIG. 3, the conventional vertical vibrator 3 comprises a casing 81 having a space of a predetermined size defined therein, a magnet 82 vertically magnetized and having a lower plate 83 mounted on a lower surface of the magnet 60, a yoke 84 to which the magnet 82 is mounted to form a magnetic circuit, a spring member 86 mounted between the casing 81 and the yoke 84 to vertically vibrate a vibrating body comprising a weight 85 mounted to the yoke 84, and a vibration coil 87 provided on an upper surface of a bracket 88 for closing a lower portion of the casing 81.

Operation of the vertical vibrator 3 constructed as described above is performed in the following fashion. When power is supplied to the vibration coil 87, the vibrating body vertically vibrates by virtue of interaction between a magnetic field generated from a magnetic circuit constituted by the magnet 82, the lower plate 83, and the yoke 84 and an electric field generated from the vibration coil 87, in which the vibration body comprising the magnet 82, the lower plate 83, the yoke 84 and the weight 85 is suspended within the casing 81 via the spring member 86.

However, if vertical displacement of the vibrating body meets or exceeds a predetermined maximum value during operation of the conventional vertical vibrator 3, the vibrating body comprising the spring member 86 generates contact noise through direct contact with the casing provided as an upper structure. This contact noise is the main source of noise associated with operation of the vertical vibrator.

Moreover, if bonding force between the yoke 84 and the magnet 82 is low, as determined by drop testing, the magnet 82 can be easily separated from the yoke 84, thereby increasing the frequency of defective products.

SUMMARY OF THE INVENTION

The present invention has been made to solve the above problems, and it is an object of the present invention to provide a vertical vibrator, designed to absorb contact noise and impact which can occur upon excessive vertical displacement of a vibration part, thereby providing a stable vibration wave form.

It is another object of the present invention to provide a vertical vibrator designed to ensure convenient and appropriate positioning of magnetic fluids by use of magnetic flux leaked from a yoke, and designed to have an extended life span by increasing coupling force between a magnet and the yoke.

In accordance with one aspect of the present invention, the above and other objects can be accomplished by the provision of a vertical vibrator, comprising: a casing having a space of a predetermined size defined therein; a magnetic field part located in the space of the casing, the magnetic field part including a yoke, and a magnet vertically magnetized and fixed to a closed inner surface of the yoke for generating a magnetic field of a predetermined intensity; a spring member fixed at one end to the casing and at the other end to the magnetic field part; a vibration part having a weight integrally mounted to the magnetic field part and vertically vibrating together with the magnetic field part through the spring member; a vibration coil located at a position directly below the magnetic field part for generating an electric field of a predetermined intensity upon application of power; and a magnetic fluid applied to an upper surface of the spring member corresponding to the magnet so as to be fixed in position by a magnetic flux leaked from the magnet.

Preferably, the casing has at least one injection hole perforated therethrough, and the injection hole has an inner diameter smaller than an outer diameter of the magnet.

More preferably, the injection hole is sealed by a tape member bonded to the casing.

Preferably, the yoke is formed with a seat depressed a predetermined depth from one of closed upper and lower surfaces thereof corresponding to the upper surface of the magnet and having the same cross-section as that of the magnet, and more preferably, the seat has an inner diameter larger than that of the injection hole.

Preferably, the yoke has a ring-shaped recess corresponding to an outer periphery of the upper surface of the magnet and formed on one of closed upper and lower surfaces thereof corresponding to the upper surface of the magnet, and more preferably, the ring-shaped recess has an inner diameter larger than that of the injection hole.

Preferably, the spring member is mounted on the upper surface with a ring-shaped positioning member corresponding to an outer periphery of the upper surface of the magnet so as to be magnetized by the magnet, and the positioning member has an inner diameter larger than that of the injection hole.

More preferably, the positioning member is a pattern member printed on the upper surface of the spring member or comprises a magnetic material having a magnetic force of a predetermined intensity.

Preferably, the vertical vibrator further comprises a lower plate mounted on a lower surface of the magnet so as to generate a magnetic flux flowing from an open side of the yoke through a lower end of the yoke via the coil.

Preferably, the weight is formed with a central hole having a latching groove, and the yoke has a latching jaw outwardly formed at a lower end of the yoke, so that when the yoke is inserted into the weight through the central hole, the latching jaw of the yoke is disposed on the latching groove of the central hole so as to prevent the weight from being separated, and more preferably, the latching jaw is located above a lower surface of the weight.

Preferably, the spring member is a plate spring comprising a fixing ring having an upper end fixed to a closed lower surface of the casing, a plurality of resilient legs connected at one end to the fixing ring for generating resilient force, and a fixing disk connected to the other end of the resilient legs while being fixed to an upper surface of the yoke or an upper surface of the weight.

Preferably, the vibration coil is provided on an upper surface of the bracket closing a lower portion of the casing, and more preferably, the bracket is a substrate member having a terminal electrically connected to the vibration coil for supplying power.

In accordance with another aspect of the present invention, a vertical vibrator is provided, which comprises: a casing having a space of a predetermined size defined therein; a magnetic field part located in the space of the casing, the magnetic field part including a yoke, and a magnet vertically magnetized and fixed to a closed inner surface of the yoke for generating a magnetic field of a predetermined intensity; a spring member fixed at one end to the casing and at the other end to the magnetic field part; a vibration part having a weight integrally mounted to the magnetic field part and vertically vibrating together with the magnetic field part via the spring member; a vibration coil located at a position directly below the magnetic field part for generating an electric field of a predetermined intensity upon application of power; and a magnetic fluid applied to an upper surface of the magnetic field part corresponding to the magnet so as to be fixed in position by a magnetic flux leaked from the magnet.

Preferably, the casing has at least one injection hole perforated therethrough such that the magnetic fluid is injected through the injection hole, and the injection hole has an inner diameter smaller than an outer diameter of the magnet.

More preferably, the injection hole is sealed by a tape member bonded to the casing.

Preferably, the yoke is formed with a seat depressed a predetermined depth from one of closed upper and lower surfaces thereof corresponding to the upper surface of the magnet and having the same cross-section as that of the magnet, and more preferably, the seat has an inner diameter larger than that of the injection hole.

Preferably, the yoke has a ring-shaped recess corresponding to an outer periphery of the upper surface of the magnet and formed on one of closed upper and lower surfaces thereof corresponding to the upper surface of the magnet, and more preferably, the ring-shaped recess has an inner diameter larger than that of the injection hole.

Preferably, a ring-shaped positioning member is mounted on the upper surface of the yoke corresponding to an outer periphery of the upper surface of the magnet so as to be magnetized by the magnet. The positioning member preferably has an inner diameter larger than that of the injection hole.

More preferably, the positioning member is a pattern member printed on the upper surface of the spring member or comprises a magnetic material having a magnetic force of a predetermined intensity.

Preferably, the vertical vibrator further comprises a lower plate mounted on a lower surface of the magnet so as to generate a magnetic flux flowing from an open side of the yoke through a lower end of the yoke via the coil.

Preferably, the weight is formed with a central hole having a latching groove, and the yoke has a latching jaw outwardly formed at a lower end of the yoke, so that when the yoke is inserted into the weight through the central hole, the latching jaw of the yoke is disposed on the latching groove of the central hole so as to prevent the weight from separation, and more preferably, the latching jaw is located above a lower surface of the weight.

Preferably, the spring member is a plate spring comprising a fixing ring having an upper end fixed to a closed lower surface of the casing, a plurality of resilient legs connected at one end to the fixing ring for generating resilient force, and a fixing part connected to the other end of the respective resilient legs while being fixed to an upper surface of the yoke or an upper surface of the weight, the fixing part having an opening perforated therethrough for exposing the upper surface of the yoke.

Preferably, the spring member consists of at least one plate spring comprising a fixing ring having an outer end fixed to an inner peripheral surface of the casing, a plurality of resilient legs connected at one end to the fixing ring for generating resilient force, and a fixing part connected to the other end of the respective resilient legs and having an opening perforated through the fixing part, the opening being fixed at an inner end to an outer peripheral surface of the weight.

Preferably, the spring member is at least one coil spring having an upper end fixed to a closed lower portion of the casing, and a lower end fixed to an upper surface of the yoke or an upper surface of the weight.

Preferably, the vibration coil is provided on an upper surface of the bracket closing a lower portion of the casing, and more preferably, the bracket is a substrate member having a terminal electrically connected to the vibration coil for supplying power.

BRIEF DESCRIPTION OF THE DRAWINGS

The foregoing and other objects and features of the present invention will be more clearly understood from the following detailed description taken in conjunction with the accompanying drawings, in which.

DESCRIPTION OF THE PREFERRED EMBODIMENTS

Preferred embodiments will now be described in detail with reference to the accompanying drawings.

Figure 4:
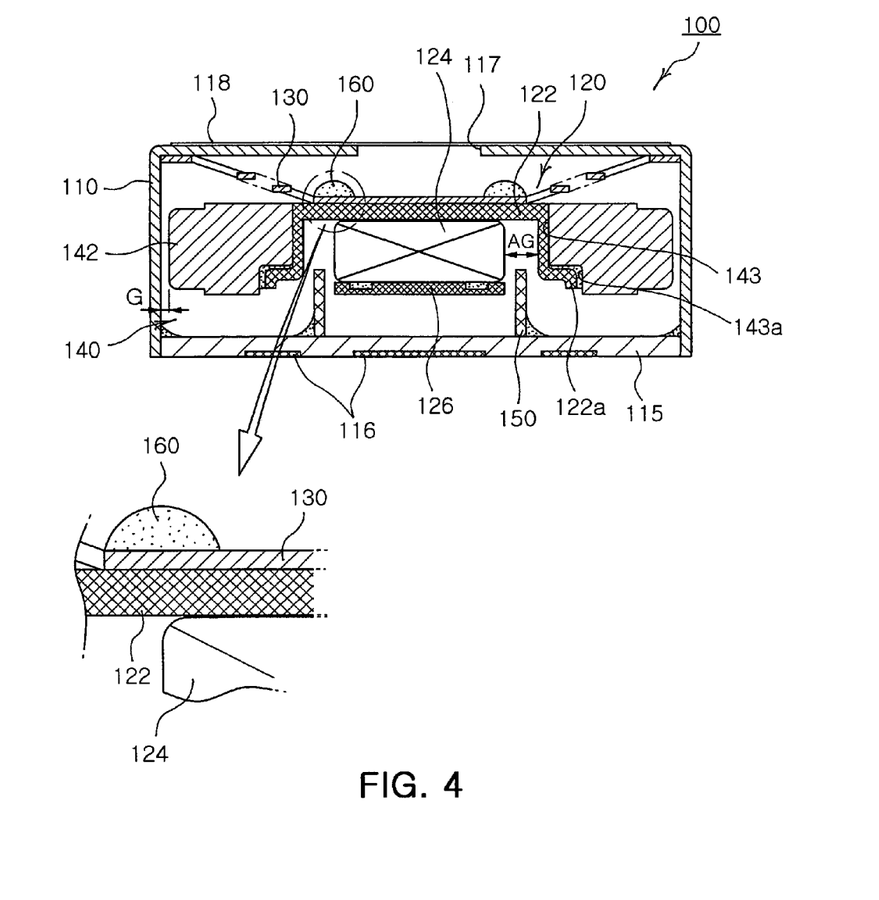
FIG. 4 is a cross-sectional view of a vertical vibrator according to a first embodiment of the present invention.

FIG. 4 is a cross-sectional view of a vertical vibrator according to a first embodiment of the present invention. As shown in FIG. 4, the vertical vibrator 100 of the invention can prevent contact noise from being generated by undesired contact between an upper structure and a vibration member vertically vibrating with regard to a fixed member, and allows convenient and accurate positioning of a direct contact-preventing member by use of a leaked magnetic flux, thereby increasing vibration efficiency while ensuring stable vertical vibration.

The vertical vibrator 100 comprises a casing 110, a magnetic field part 120, a spring member 130, a vibration part 140, a vibration coil 150, and a magnetic fluid 160.

The casing 110 serves as a receiving member having a space of a predetermined size defined therein, and is closed at a lower portion thereof by a bracket 115.

The casing 110 has at least one injection hole 117 of a predetermined size perforated through the casing 110. Preferably, the injection hole 117 has an inner diameter smaller than an outer diameter of a magnet 124 such that the magnetic fluid 160 fixed in position by the leaked magnetic flux is located at an outer portion of the injection hole 117 rather than in an inner portion thereof.

The magnetic field part 120 is located within the space of the casing 110, and comprises a yoke 122 and a magnet 124 for generating a magnetic field of a predetermined intensity, in which the yoke 122 has a substantially hollow-cylindrical shape closed at an upper portion and opened at a lower portion.

The magnet 124 is a cylindrical permanent magnet vertically magnetized such that upper and lower portions thereof have opposite polarities, and generating a magnetic force with a predetermined magnitude. An upper surface of the magnet 124 is bonded to a closed lower surface of the space of the yoke 122 by means of a bonding material so as to be fixed at the inner center of the yoke 122.

The yoke 122 has an inner diameter different from an outer diameter of the magnet 124. This creates an air gap AG having a predetermined size between an inner surface of the yoke 122 and an outer surface of the magnet 124. The upper end of the vibration coil 150 is located within the air gap AG. Accordingly, during vertical vibration, the magnetic field part constituted by the yoke 122 and the magnet 124 is prevented from contacting the vibration coil 150 by virtue of the air gap AG.

Preferably, a lower plate 126 is mounted on a lower surface of the magnet 124 so as to smoothly generate the magnetic flux, which is a flow of magnetic force towards the opened side of the yoke 122 through the coil 150 to the lower end of the yoke 122.

At this time, a lower surface of the lower plate 126 is substantially collinear with a lower surface of the vibration part 140 comprising the magnetic field part 120 and the weight 142.

The spring member 130 is a resilient member fixed at one end to the casing 110, and at the other end to the magnetic field part 120.

Figure 5:
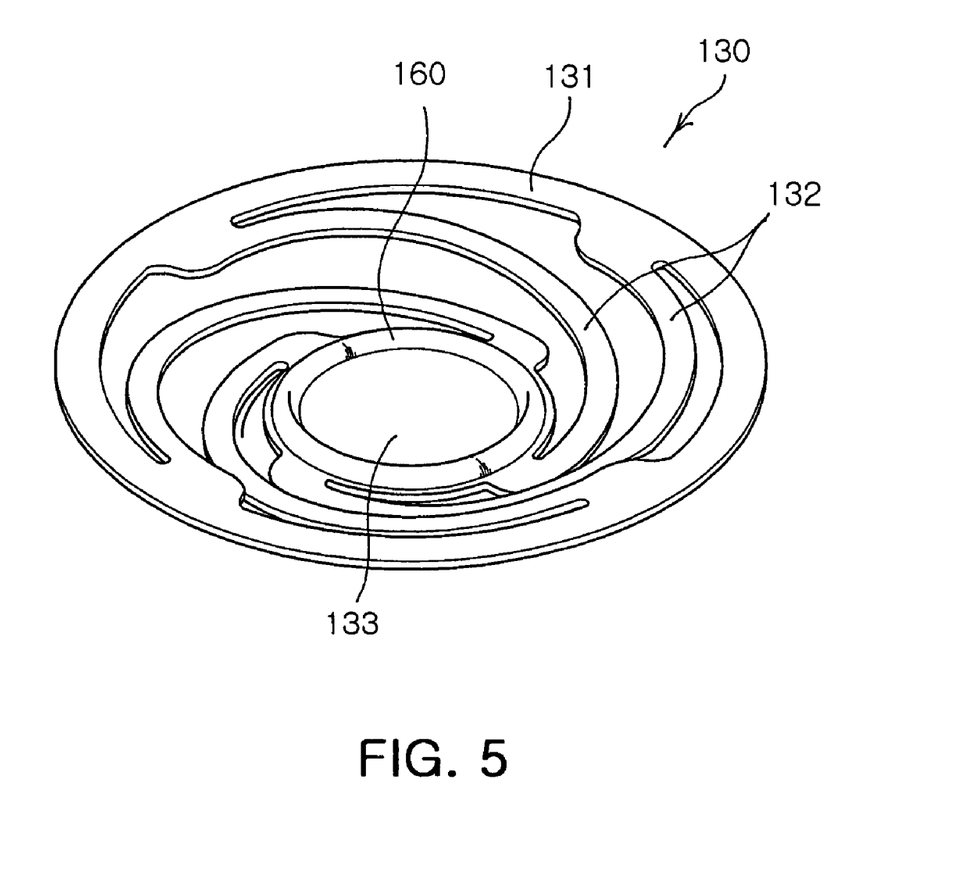
FIG. 5 is a perspective view of a spring member employed in the vertical vibrator according to the first embodiment of the present invention.

As shown in FIGS. 4 and 5, the spring member 130 is provided as a plate spring comprising a fixing ring 131 having an upper end fixed to a closed lower surface of the casing 110, a plurality of resilient legs 132 spirally extending from one end thereof connected to the fixing ring 131 so as to generate resilient force, and a fixing disk 133 connected to the other end of the resilient legs 132 while being fixed to an upper surface of the yoke 122 constituting the magnetic field part 120 or to an upper surface of the weight 142.

The vibration part 140 is adapted to vertically vibrate via the spring member 130, and has the hollow-cylindrical weight 142 integrally mounted on an outer surface of the yoke 122 constituting the magnetic field part 120. The weight 142 has a central hole 143 perforated through the center thereof, into which the body of the yoke 122 is inserted.

The central hole 143 is formed at a lower end of an inner surface thereof with a latching groove 143a, on which a latching jaw 122a outwardly formed at a lower end of the yoke 122 is disposed so that when the yoke 122 is inserted into the weight 122 through the central hole 143, separation of the weight 142 is prevented.

Here, the latching jaw 112a is located above a lower surface of the weight 142. In this manner, the latching jaw 112a prevents the vibration coil 150 from contacting the bonding material, which is applied to an outer surface of a lower end of the vibration coil 150 in order to fix the vibration coil 150 to an upper surface of the bracket 115 when the vibration part 140 is at the bottom of the stroke, thereby ensuring a maximum vertical amplitude of the vibration part 140.

The weight 142 has an outer diameter smaller than an inner diameter of the inner surface of the casing 110 so as to vertically vibrate without contacting the inner surface of the casing 110 upon vertical vibration. Accordingly, a gap G having a predetermined size is created between the inner surface of the casing 110 and the outer surface of the weight 142.

Preferably, the weight 142 is formed of a non-magnetic material, which has a specific gravity of 18 or more, and thus is not affected by magnetic force generated by the magnet 124.

The vibration coil 150 is located at a position directly below the magnetic field part 120, and is bonded to the upper surface of the bracket 115 closing the lower portion of the casing 110 by means of the bonding material so as to generate electric force having a predetermined intensity when power is applied from an external power supplier.

An upper end of the vibration coil 150 is located in the air gap AG formed between the inner surface 122 of the yoke 122 and the outer surface of the magnet 124 so as to ensure smooth interaction between the magnetic field generated by the magnetic field part 120 and the electric field generated by the vibration coil 150.

The bracket 115 is a substrate member having cathode and anode terminals 116 formed on an upper surface of the substrate member while being electrically connected to the vibration coil 150 for supplying power thereto.

The magnetic fluid 160 is an impact absorbing fluid applied to an upper surface of the fixing disk 133 of the spring member 130 through the injection hole 117. The injection hole 117 is formed on the upper surface of the casing 110 so as to suppress direct contact between the fixed casing 110 and the movable vibration part 140 upon vertical vibration of the vibration part 140 comprising the magnetic field part 130 and to absorb the contact noise and impact caused by the contact.

The magnetic fluid 160 applied to the fixing disk 133 has a ring shape fixed in position corresponding to an outer periphery of the upper surface of the magnet 124 by the magnetic flux leaked from the outer periphery of the upper surface of the magnet 124 mounted on the closed lower surface of the yoke 122 so as to absorb contact noise and impact caused by the contact between the vibration part 140 and different members upon vertical vibration of the vibration part 140

With regard to this, the magnet 124 preferably has an outer diameter larger than an inner diameter of the injection hole 117 such that the magnetic fluid 160 having the ring shape fixed in position on the fixing disk 133 of the spring member 130 by virtue of the magnetic flux leaked from the outer periphery of the upper surface of the magnet 124 is prevented from being located at the place corresponding to the inner diameter of the injection hole 117. Thus, the magnetic fluid 160 can always be located corresponding to the lower surface of the casing 110 which is not formed with the injection hole 117.

The injection hole 117 is securely sealed by a tape member 118 attached to the upper surface of the casing 110 and having a label printed on a surface thereof so as to prevent the magnetic fluid 160 injected through the injection hole 117 from leaking to the outside.

The magnetic fluid is a colloid formed by stabilizing and dispersing magnetic powders in a liquid. A surfactant is added to the colloid so as to prevent the magnetic powders from being deposited or aggregated due to gravity or the magnetic fields. The magnetic fluid includes, for example, a dispersion of fine particles, such as triiron tetroxide (Fe3O4) or iron-cobalt alloy, in an oil or water, a dispersion of cobalt in toluene, and the like. The magnetic powders are super fine particles having a size of 0.01~0.02 μm. Super fine powders at this scale exhibit Brownian motion, and have characteristics in which the concentration of the magnetic power in the fluid is maintained at a constant value even if an external magnetic field, gravity, centrifugal force, or the like is applied thereto.

Figure 6:
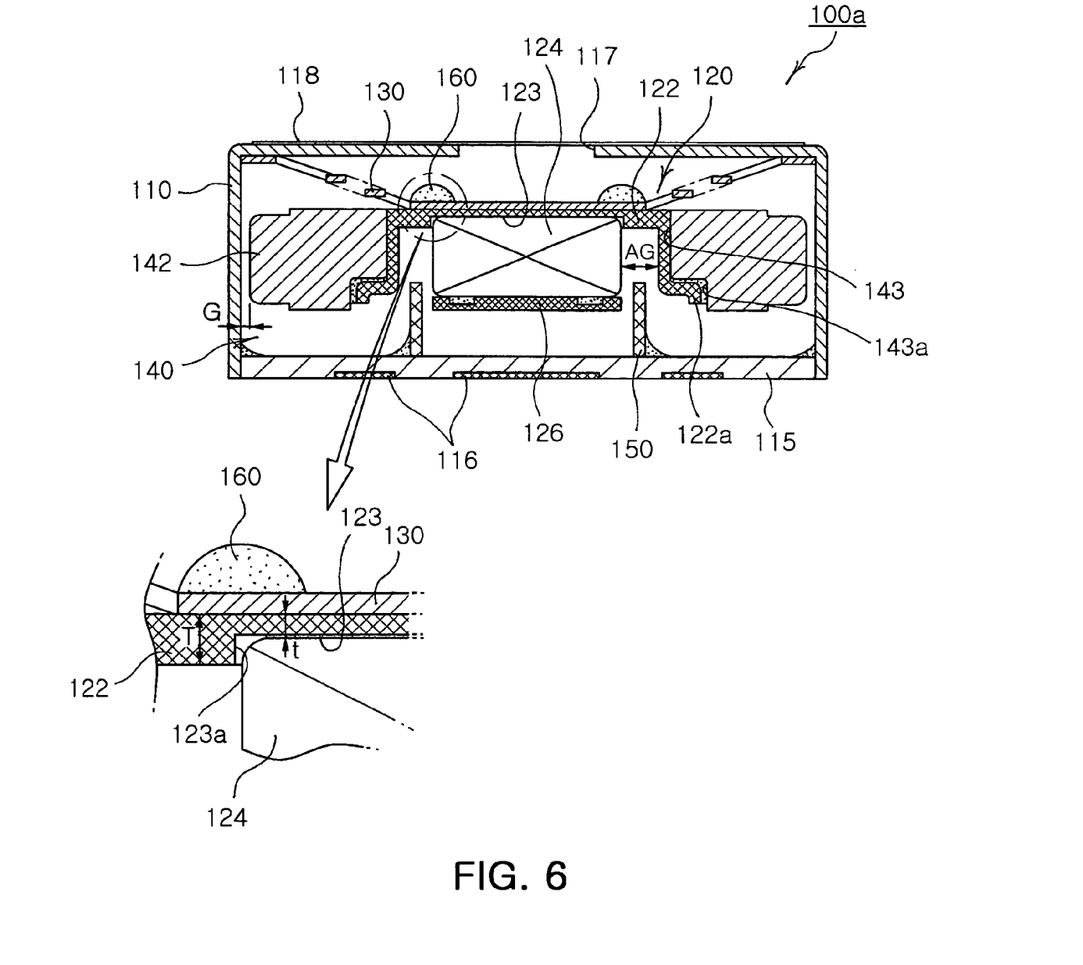
FIG. 6 is a cross-sectional view of a vertical vibrator according to a second embodiment of the present invention.

FIG. 6 is a cross-sectional view of a vertical vibrator according to a second embodiment of the present invention. Referring to FIG. 6, as with the first embodiment, the vertical vibrator 100a of the second embodiment comprises a casing 110, a magnetic field part 120, a spring member 130, a vibration part 140, a vibration coil 150, and a magnetic fluid 160. In the description of the vertical vibrator 100a, components of the second embodiment identical to those of the above embodiments will be denoted by the same reference numerals, and a description thereof will be omitted.

The yoke 122 constituting the magnetic field part 120 has a seat 123 depressed a predetermined depth from a closed lower surface of the yoke 122 defining an inner space of the yoke 122. The seat 123 is bonded to an upper surface of the magnet 124 by use of a bonding material such that the magnet 124 is fixed at the inner center of the yoke 122. The seat 123 is depressed from the yoke 122 when pressing the yoke 122.

Here, in FIG. 6, although the seat 123 is depressed from the closed lower surface of the yoke 122 corresponding to the upper surface of the magnet 124, the present invention is not limited to this construction. Alternatively, the seat 123 may be depressed from a closed upper surface of the yoke 122 corresponding to the fixing disk 133 of the spring member 130, and in this case, magnetic flux leakage is the same as the case where the seat 123 is formed from the closed lower surface of the yoke 122.

At this time, it is desirable that the seat 126 is depressed the predetermined depth from the yoke 122 so as to have the same cross section as the magnet 124.

In this manner, when an inner peripheral surface 123a of the seat 123 is provided as a border between inner and outer portions of the yoke 122, the outer portion of the yoke 122 has a large thickness T, whereas the inner portion of the yoke 122 has a small thickness t. The magnetic flux supplied from the magnet 124 is linked to the electric field of the vibration coil 150, and flows from an outer side of the yoke 122 to an inner center of the yoke 122 through a lower end of the yoke 122.

Accordingly, the outer portion of the yoke 122 having the large thickness T from the border of the inner peripheral surface 123a of the seat 123 is not saturated with the magnetic flux, but the inner portion of the yoke 122 having the small thickness t is saturated with the magnetic flux, so that the magnetic flux is leaked near the inner peripheral surface 123a which is the border between the outer and inner portions of the yoke 122.

Moreover, the magnetic fluid 160 applied to the fixing disk 133 of the spring member 130 has a ring shape fixed in position corresponding to an outer periphery of the seat 123 by the magnetic flux leaked from the inner peripheral surface 123a of the seat 123, and then serves to absorb contact noise and impact caused by the contact between the vibration part 140 with different members upon vertical vibration of the vibration part 140.

With regard to this, the seat 123 preferably has an outer diameter larger than an inner diameter of the injection hole 117 such that the magnetic fluid 160 having the ring shape fixed in position by virtue of the magnetic flux leaked from the outer periphery of the magnet 124 is prevented from being located at a place in the range of the inner diameter of the injection hole 117. Thus, the magnetic flux 160 can always be located so as to correspond to the lower surface of the casing 110 which is not formed with the injection hole 117.

Figure 7:
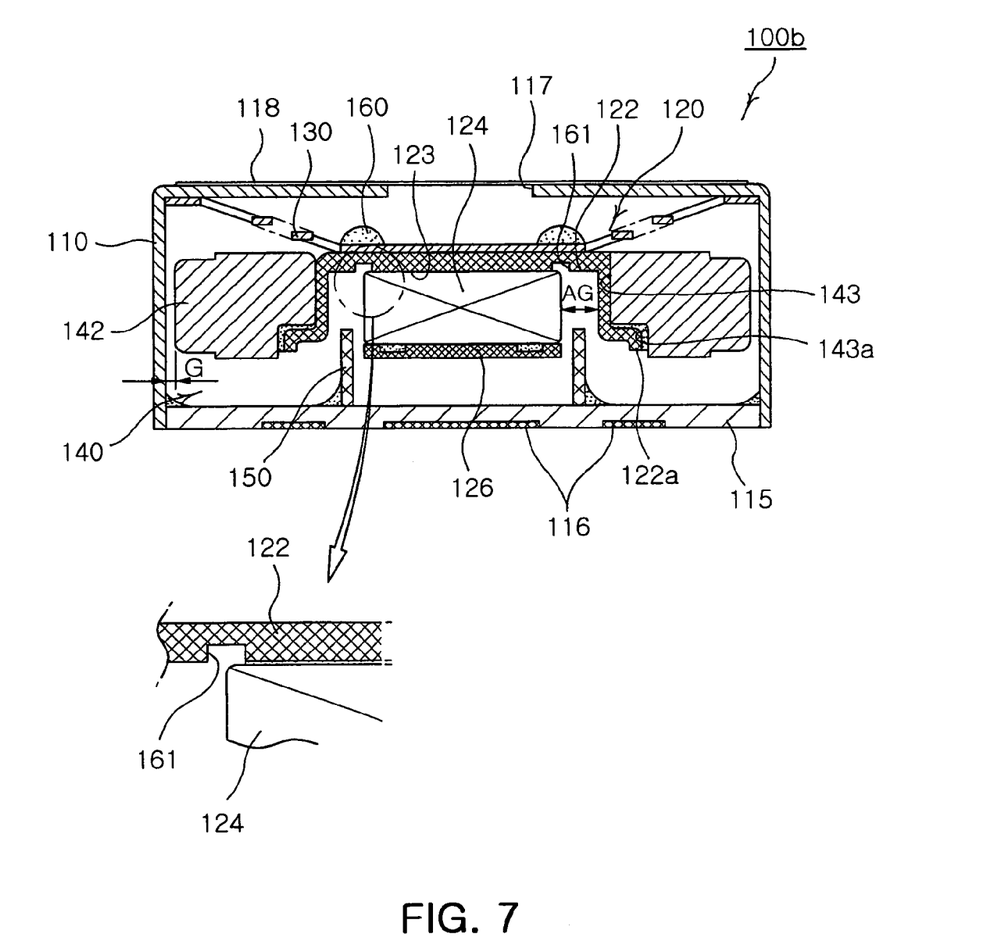
FIG. 7 is a cross-sectional view of a vertical vibrator according to a third embodiment of the present invention.

FIG. 7 is a cross-sectional view of a vertical vibrator according to a third embodiment of the invention. Referring to FIG. 7, as with the vertical vibrator according to the above embodiments, the vertical vibrator 100b of the second embodiment comprises a casing 110, a magnetic field part 120, a spring member 130, a vibration part 140, a vibration coil 150, and a magnetic fluid 160. In the description of the vertical vibrator 100b, components of the third embodiment identical to those of the above embodiments will be denoted by the same reference numerals, and a description thereof will be omitted.

The yoke 122 constituting the magnetic field part 120 has a ring-shaped recess 161 depressed a predetermined depth from a closed lower surface of the yoke 122 and corresponding to an outer periphery of the upper surface of the magnet 124 so as to allow the magnetic flux to be leaked.

Accordingly, the magnetic flux flowing through the lower surface of the magnet 124, the lower plate 126 and the yoke 122 via an upper surface of the magnet 124 is leaked through the ring-shaped recess 161 having a variable thickness, and the leaked magnetic flux can force the magnetic fluid 160 applied to the upper surface of the fixing disk 133 of the spring member 130 to be fixed in position while being maintained in a ring shape corresponding to the recess 161.

Here, in FIG. 7, the ring-shaped recess 161 is depressed from the closed lower surface of the yoke 122 corresponding to the upper surface of the magnet 124. Alternatively, as shown in FIG. 4, the ring-shaped recess 161 may be formed on the closed lower flat surface of the yoke 122 where the seat 123 is not formed, or may be depressed from a closed upper surface of the yoke 122 corresponding to the fixing disk 133 of the spring member 130, and in this case, magnetic flux leakage is the same as the case where the seat 123 is provided.

With regard to this, the ring-shaped recess 161 preferably has an inner diameter larger than an inner diameter of the injection hole 117 such that the magnetic fluid 160 fixed in position by virtue of the magnetic flux leaked from the outer periphery of the magnet 124 is prevented from being located at a place in the range of the inner diameter of the injection hole 117. Thus, the magnetic flux 160 can always be located corresponding to the lower surface of the casing 110 which is not formed with the injection hole 117.

Figure 8:
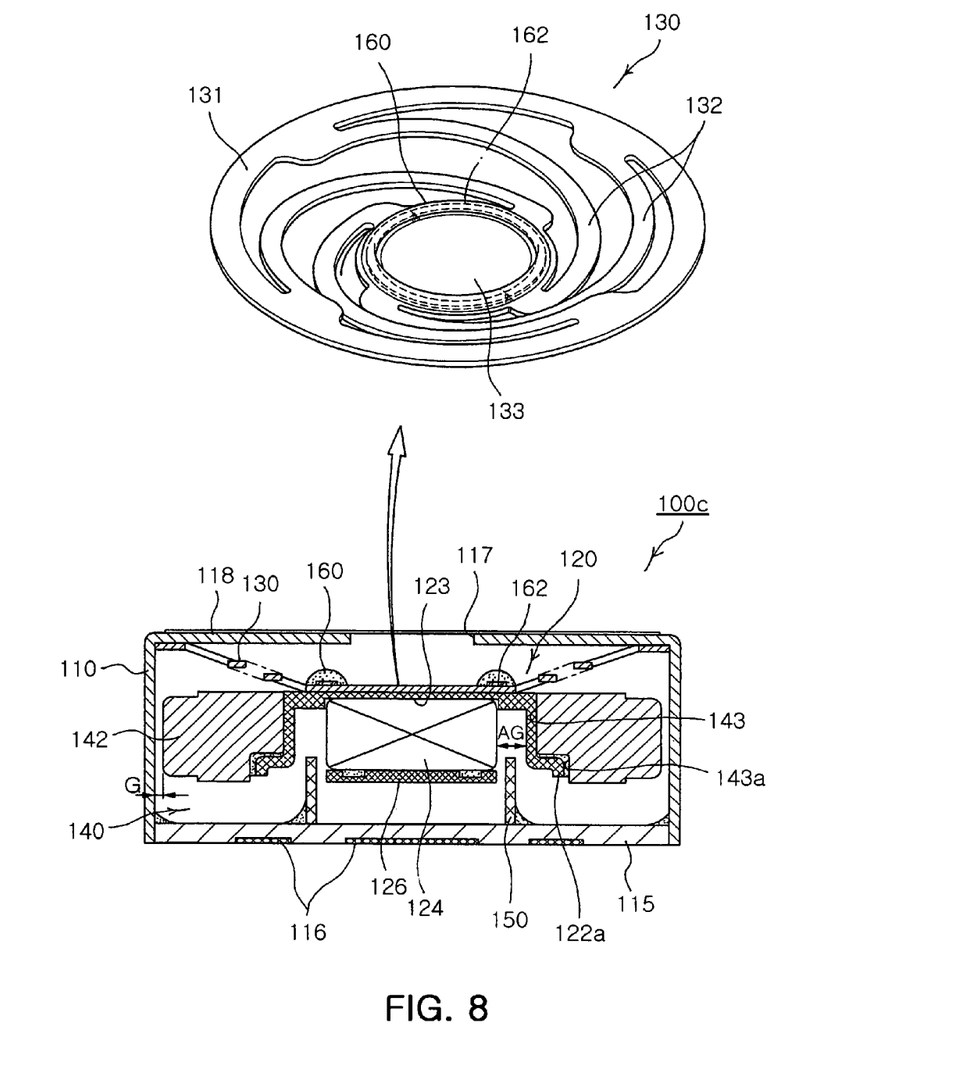
FIG. 8 is a cross-sectional view of a vertical vibrator according to a fourth embodiment of the present invention.

FIG. 8 is a cross-sectional view of a vertical vibrator according to a fourth embodiment of the invention. Referring to FIG. 8, as with the vertical vibrator according to the above embodiments, the vertical vibrator 100c of the fourth embodiment comprises a casing 110, a magnetic field part 120, a spring member 130, a vibration part 140, a vibration coil 150, and a magnetic fluid 160. In the description of the vertical vibrator 100c, components of the third embodiment identical to those of the above embodiments will be denoted by the same reference numerals, and a description thereof will be omitted.

The spring member 130 comprises a ring-shaped positioning member 162, which is mounted on the upper surface of a fixing disk 133 of the spring member 130 corresponding to an outer periphery of an upper surface of the magnet 124 and is magnetized by magnetic force of the magnet 124 so as to maintain a ring shape of the magnetic fluid 160 applied to an upper surface of the fixing disk 133 through an injection hole 117 while locating the magnetic fluid 160 in a proper place.

The positioning member 162 may be printed in a pattern on the upper surface of the fixing disk 133 of the spring member 130 or bonded as a separate member onto the fixing disk 133 of the spring member 130. Moreover, the positioning member 162 may be composed of a material which can be magnetized by the magnetic force of the magnet 124, or formed of a magnetic material which generates a magnetic force having a predetermined intensity.

Here, in FIG. 8, the positioning member 162 is formed on the upper surface of the fixing disk 133 of the spring member 130, which is provided on the yoke 122 having a seat 123 depressed from a closed lower surface of the yoke 122 corresponding to the upper surface of the magnet 124. Alternatively, as shown in FIG. 4, the positioning member 162 may be formed on the closed lower flat surface of the yoke 122 where the seat 123 is not formed, and in this case, magnetic flux leakage is the same as the case where the seat 123 is provided.

Accordingly, the magnetic fluid 160 applied to the upper surface of the fixing disk 133 of the spring member 130 through the injection hole 117 can always be located in a proper place while being maintained in the ring shape by virtue of the magnetic force generated from the positioning member 162.

With regard to this, the positioning member 162 preferably has an inner diameter larger than an inner diameter of the injection hole 117 such that the magnetic fluid 160 located in the proper place by virtue of the magnetic flux leaked therefrom is prevented from being located at a place in the range of the inner diameter of the injection hole 117. Thus, the magnetic flux 160 can always be located so as to correspond to the lower surface of the casing 110 which is not formed with the injection hole 117.

Figure 9:
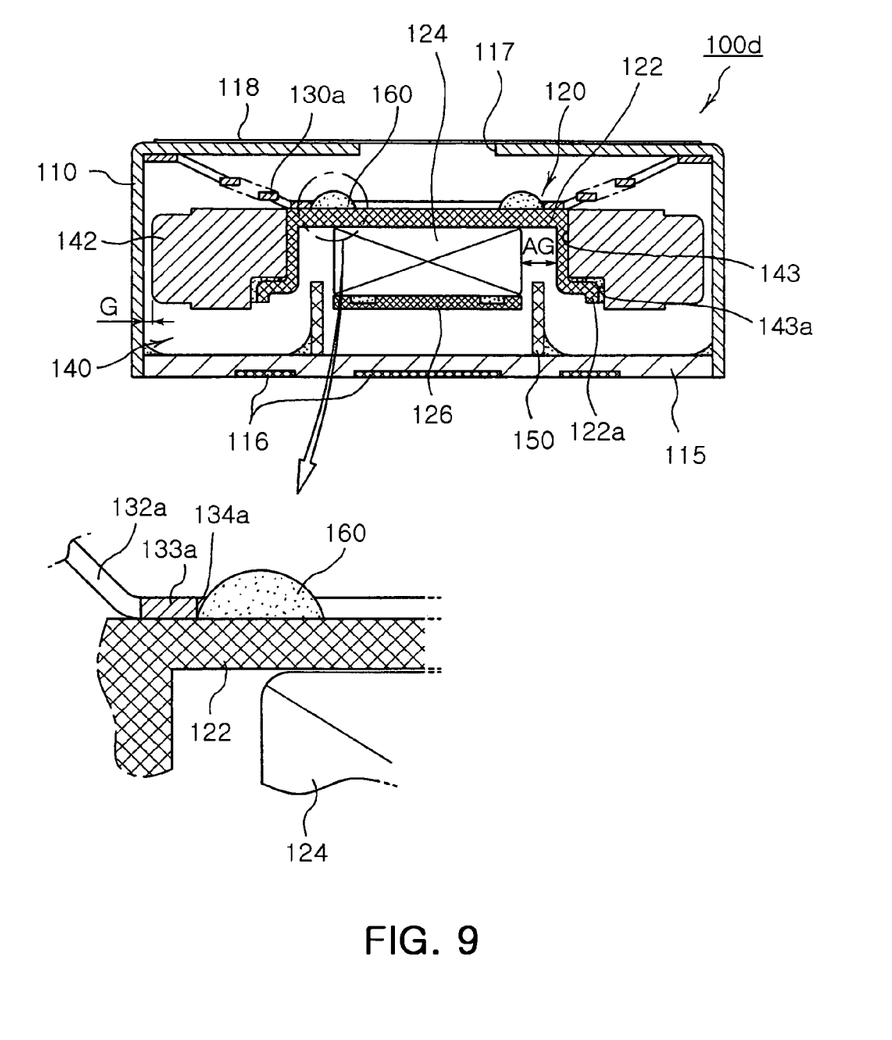
FIG. 9 is a cross-sectional view of a vertical vibrator according to a fifth embodiment of the present invention.

FIG. 9 is a cross-sectional view of a vertical vibrator according to a fifth embodiment of the invention. Referring to FIG. 9, as with the vertical vibrator according to the above embodiments, the vertical vibrator 100d of the fifth embodiment comprises a casing 110, a magnetic field part 120, a spring member 130a, a vibration part 140, a vibration coil 150, and a magnetic fluid 160. In the description of the vertical vibrator 100d, components of the third embodiment identical to those of the above embodiments will be denoted by the same reference numerals, and a description thereof will be omitted.

Figure 10:
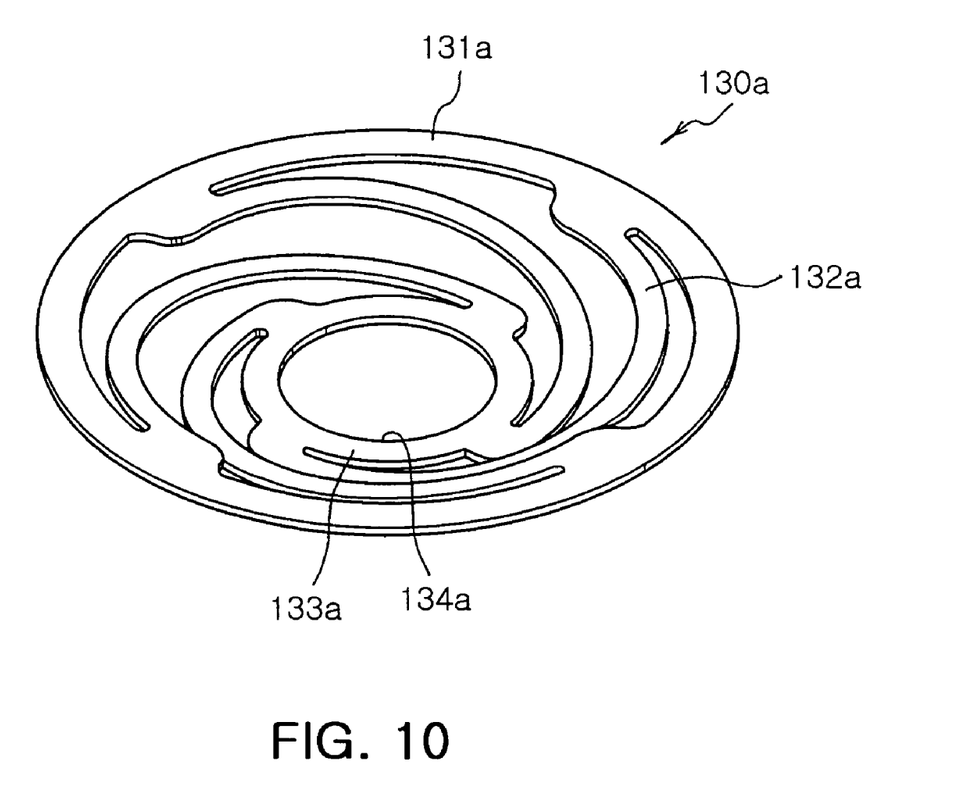
FIG. 10 is a perspective view of a spring member employed in the vertical vibrator according to the fifth embodiment of the present invention.

As shown in FIGS. 9 and 10, the spring member 130a is a resilient member located between the casing 110 and the vibration part 140 to exhibit resilient force so as to permit vertical vibration of the vibration part 140.

The spring member 130a may be provided as a plate spring comprising a fixing ring 131a having an upper end fixed to a closed lower surface of the casing 110, a plurality of resilient legs 132a spirally extending from one end thereof connected to the fixing ring 131a so as to generate resilient force, and a fixing part 133a connected to the other end of the respective resilient legs 132a and fixed to an upper surface of the yoke 122 or to an upper surface of the weight 142, in which the fixing part 133a has an opening 134a for exposing an upper surface of the yoke 122 on which magnetic fluid 160 is located.

Alternatively, the spring member 130a may be provided as at least one plate spring with an outer end of the fixing ring 131a fixed to an inner peripheral surface of the casing 110 and with the opening 134a of the fixing part 133a fixed to an outer peripheral surface of the weight 142, and is located between the inner peripheral surface of the casing 110 and the outer peripheral surface of the weight 142.

Alternatively, the spring member 130a may be provided as at least one coil spring with its upper end fixed to the closed lower surface of the casing and with its lower end fixed to the upper surface of the yoke 122 or to the upper surface of the weight 142.

Moreover, as with the second embodiment, the seat 123 may be formed on the closed upper surface or the closed lower surface of the yoke 122, and as with the third embodiment, the ring-shaped recess 161 may be formed thereon.

Moreover, as with the fourth embodiment, the yoke 122 may be provided on the upper surface thereof with the ring-shaped positioning member 162 which is magnetized by the magnetic force of the magnet 124.

When power is applied to the vibration coil 150 of the vertical vibrator 100, 100a, 100b, 100c or 100d constructed as described above, the vibration part 140 comprising the weight 142 integrally mounted on the yoke 122 and the magnetic field part 120 vertically vibrates by virtue of linkage between the electric field generated from the coil 150 and the magnetic field generated from the magnetic field part 120 constituted by the magnet 124, provided as the permanent magnet, and the lower plate 126 provided to the lower portion of the yoke 122 comprising the magnet 124. At this time, the vertical amplitude of the vibration part 140 is determined by the resilient force of the spring member 130 or 130a connected at the upper end to the casing 100.

During the vertical vibration of the vibration part 140 within the space of the casing 110, when a resonance frequency of the vibration part 140 rises above a predetermined frequency, the vibration part 140 is momentarily raised above an upper limit of the amplitude, and tends to contact an inner surface of the upper portion of the casing 110. However, in this case, the magnetic fluid 160 contacts the inner surface of the upper portion thereof earlier than the vibration part 140, thereby preliminary preventing direct impact between the vibration part 140 and the inner surface of the casing 110, and absorbing the impact and contact noise caused by the contact.

The magnetic fluid 160 can be maintained in the ring shape on the upper surface of the fixing disk 133 of the spring member 130 or on the upper surface of the yoke 122 by virtue of the magnetic flux leaked from the outer periphery of the magnet 124, and can be maintained in an initial state without being changed in position during the vertical vibration of the vibration part 140.

As shown in FIG. 6, when the seat 123 is formed on the closed lower surface of the yoke 122, the magnetic fluid 160 can be maintained in an initial state without being changed in position during the vertical vibration of the vibration part 140 while being maintained in the ring shape on the fixing disk 133 by virtue of the magnetic flux leaked near the inner peripheral surface 123a of the seat 123 on which the magnet 124 is mounted.

Additionally, in comparison to the case where the upper surface of the magnet 124 is brought into face-to-face contact with the closed lower flat surface of the yoke 122 and is then bonded thereto, as shown in FIG. 4, when the magnet 124 is fitted to the seat 123 depressed the predetermined depth from the closed lower surface of the yoke 122 and is then bonded thereto by use of the bonding material, a contact area between the yoke 122 and the magnet 124 is increased, resulting in an increased coupling force therebetween. Such an increased coupling force prevents the magnet 124 from being separated from the yoke 122, as was verified by drop testing, thereby decreasing the frequency of defective products.

Moreover, when the magnet 124 is fitted to the seat 123, the magnet 124 has a thickness corresponding to the predetermined depth of the seat 124 depressed from the lower surface of the yoke 122, and generates magnetic force of a larger magnitude than the case where the upper surface of the magnet 124 is brought into the face-to-face contact with the closed lower flat surface of the yoke 122 and is bonded thereto, thereby providing greater vertical vibration force.

As shown in FIG. 7, when the ring-shaped recess 161 is formed on the closed lower surface of the yoke 122, the magnetic fluid 160 applied to the upper surface of the fixing disk 133 of the spring member 130 is maintained in the ring shape by virtue of magnetic force leaked from the recess 161. Thus, the magnetic fluid 160 can be maintained in the initial state without being changed in position during the vertical vibration of the vibration part 140, and can absorb the contact noise and impact caused by the contact between the fixed members and the vibrating members upon the vertical vibration.

As shown in FIG. 8, when the ring-shaped positioning member 162 is formed on the fixing disk 133 of the spring member 130 corresponding to the outer periphery of the upper surface of the magnet 124, the magnetic fluid 160 applied to the upper surface of the fixing disk 133 can be maintained in the initial ring shape position by virtue of the magnetic force supplied from the positioning member 162 during the vertical vibration of the vibration part 140, thereby absorbing the contact noise and impact caused by the contact between the fixed members and the vibrating members upon the vertical vibration of the vibration part 140.

As shown in FIG. 9, when the magnetic fluid 160 is located on the upper surface of the yoke 122 exposed to the outside through the opening 134a of the spring member 130a, the magnetic fluid 160 is more securely maintained in the ring shape by virtue of magnetic flux leaked from the outer periphery of the upper surface of the magnet 124. As a result, the magnetic fluid 160 can be stably maintained in the initial position during the vertical vibration of the vibration part 140. Further, the magnetic fluid 160 can absorb the contact noise and impact caused by the contact between the fixed members and the vibrating members upon the vertical vibration of the vibration part 140.

As apparent from the above description, the magnetic fluid maintained in the initial position while having the ring shape by virtue of the leaked magnetic flux or magnetic force of the magnet during the vertical vibration of the vibration part is provided on the upper surface of the yoke or the spring member. Additionally, the magnetic fluid prevents the direct contact between the members when the vibration part momentarily rises above the upper limit of the amplitude, while absorbing the contact noise and impact caused by the contact, thereby providing a stable vertical vibration wave form, ensuring a large degree of vibration leading to enhancement in efficiency of a call termination means, and extending life span of the instrument using the same.

Moreover, the bonding area between the yoke and the magnet can be increased, leading to an increase of the coupling force between the yoke and the magnet, which prevents the magnet from being separated from the yoke, as was verified by drop testing, thereby decreasing the frequency of defective products.

It should be understood that the embodiments and the accompanying drawings have been described for illustrative purposes and the present invention is limited only by the following claims. Further, those skilled in the art will appreciate that various modifications, additions and substitutions are allowed without departing from the scope and spirit of the invention as set forth in the accompanying claims.

What is claimed is:

1. A vertical vibrator, comprising:
   a casing having a space of a predetermined size defined therein;
   a magnetic field part located in the space of the casing, the magnetic field part including a yoke, and a magnet vertically magnetized and fixed to a closed inner surface of the yoke for generating a magnetic field of a predetermined intensity;
   a spring member fixed at one end to the casing and at the other end to the magnetic field part;
   a vibration part having a weight integrally mounted to the magnetic field part and vertically vibrating together with the magnetic field part via the spring member;
   a vibration coil located at a position directly below the magnetic field part for generating an electric field of a predetermined intensity upon application of power; and
   a magnetic fluid applied to an upper surface of the spring member corresponding to the magnet so as to be fixed in position by a magnetic flux leaked from the magnet.

2. The vertical vibrator as set forth in claim 1, wherein the casing has at least one injection hole perforated therethrough.

3. The vertical vibrator as set forth in claim 2, wherein the injection hole has an inner diameter smaller than an outer diameter of the magnet.

4. The vertical vibrator as set forth in claim 2, wherein the injection hole is sealed by a tape member bonded to the casing.

5. The vertical vibrator as set forth in claim 1, wherein the yoke is formed with a seat depressed a predetermined depth from one of closed upper and lower surfaces of the yoke corresponding to an upper surface of the magnet and having the same cross-section as that of the magnet.

6. The vertical vibrator as set forth in claim 5, wherein the seat has an inner diameter larger than that of the injection hole.

7. The vertical vibrator as set forth in claim 1, wherein the yoke has a ring-shaped recess corresponding to an outer periphery of the upper surface of the magnet, and formed on one of closed upper and lower surfaces of the yoke corresponding to an upper surface of the magnet.

8. The vertical vibrator as set forth in claim 7, wherein the ring-shaped recess has an inner diameter larger than that of the injection hole.

9. The vertical vibrator as set forth in claim 1, wherein the spring member is mounted on the upper surface with a ring-shaped positioning member corresponding to an outer periphery of an upper surface of the magnet so as to be magnetized by the magnet.

10. The vertical vibrator as set forth in claim 9, wherein the positioning member has an inner diameter larger than that of the injection hole.

11. The vertical vibrator as set forth in claim 9, wherein the positioning member is a pattern member printed on an upper surface of the spring member.

12. The vertical vibrator as set forth in claim 9, wherein the positioning member comprises a magnetic material having a magnetic force of a predetermined intensity.

13. The vertical vibrator as set forth in claim 1, further comprising a lower plate mounted on a lower surface of the magnet so as to generate a magnetic flux flowing from an open side of the yoke through a lower end of the yoke via the coil.

14. The vertical vibrator as set forth in claim 1, wherein the weight is formed with a central hole having a latching groove, and the yoke has a latching jaw outwardly formed at a lower end of the yoke, so that when the yoke is inserted to the weight through the central hole, the latching jaw of the yoke is disposed on the latching groove of the central hole so as to prevent the weight from being separated.

15. The vertical vibrator as set forth in claim 14, wherein the latching jaw is located above a lower surface of the weight.

16. The vertical vibrator as set forth in claim 1, wherein the spring member is a plate spring comprising a fixing ring having an upper end fixed to a closed lower surface of the casing, a plurality of resilient legs connected at one end to the fixing ring for generating resilient force, and a fixing disk connected to the other end of the resilient legs while being fixed to an upper surface of the yoke or an upper surface of the weight.

17. The vertical vibrator as set forth in claim 1, wherein the vibration coil is provided on an upper surface of the bracket closing a lower portion of the casing.

18. The vertical vibrator as set forth in claim 1, wherein the bracket is a substrate member having a terminal electrically connected to the vibration coil for supplying power to the vibration coil.

19. A vertical vibrator, comprising:
a casing having a space of a predetermined size defined therein;
a magnetic field part located in the space of the casing, the magnetic field part including a yoke, and a magnet vertically magnetized and fixed to a closed inner surface of the yoke for generating a magnetic field of a predetermined intensity;
a spring member fixed at one end to the casing and at the other end to the magnetic field part;
a vibration part having a weight integrally mounted to the magnetic field part and vertically vibrating together with the magnetic field part through the spring member;
a vibration coil located at a position directly below the magnetic field part for generating an electric field of a predetermined intensity upon application of power; and
a magnetic fluid applied to an upper surface of the magnetic field part corresponding to the magnet so as to be fixed in position by a magnetic flux leaked from the magnet.

20. The vertical vibrator as set forth in claim 19, wherein the casing has at least one injection hole perforated there through such that the magnetic fluid is injected through the injection hole.

21. The vertical vibrator as set forth in claim 20, wherein the injection hole has an inner diameter smaller than an outer diameter of the magnet.

22. The vertical vibrator as set forth in claim 20, wherein the injection hole is sealed by a tape member bonded to the casing.

23. The vertical vibrator as set forth in claim 19, wherein the yoke is formed with a seat depressed a predetermined depth from one of closed upper and lower surfaces of the yoke corresponding to an upper surface of the magnet and having the same cross-section as that of the magnet.

24. The vertical vibrator as set forth in claim 23, wherein the seat has an inner diameter larger than that of the injection hole.

25. The vertical vibrator as set forth in claim 19, wherein the yoke has a ring-shaped recess corresponding to an outer periphery of the upper surface of the magnet, and formed on one of closed upper and lower surfaces of the yoke corresponding to an upper surface of the magnet.

26. The vertical vibrator as set forth in claim 25, wherein the ring-shaped recess has an inner diameter larger than that of the injection hole.

27. The vertical vibrator as set forth in claim 19, wherein the yoke is mounted on the upper surface with a ring-shaped positioning member corresponding to an outer periphery of the upper surface of the magnet so as to be magnetized by the magnet.

28. The vertical vibrator as set forth in claim 27, wherein the positioning member has an inner diameter larger than that of the injection hole.

29. The vertical vibrator as set forth in claim 27, wherein the positioning member is a pattern member printed on an upper surface of the yoke.

30. The vertical vibrator as set forth in claim 27, wherein the positioning member comprises a magnetic material having a magnetic force of a predetermined intensity.

31. The vertical vibrator as set forth in claim 19, further comprising a lower plate mounted on a lower surface of the magnet so as to generate a magnetic flux flowing from an open side of the yoke through a lower end of the yoke via the coil.

32. The vertical vibrator as set forth in claim 19, wherein the weight is formed with a central hole having a latching groove, and the yoke has a latching jaw outwardly formed at a lower end of the yoke, so that when the yoke is inserted into the weight through the central hole, the latching jaw of the yoke is disposed on the latching groove of the central hole so as to prevent the weight from being separated.

33. The vertical vibrator as set forth in claim 32, wherein the latching jaw is located above a lower surface of the weight.

34. The vertical vibrator as set forth in claim 19, wherein the spring member is a plate spring comprising a fixing ring having an upper end fixed to a closed lower surface of the casing, a plurality of resilient legs connected at one end to the fixing ring for generating resilient force, and a fixing part connected to the other end of the respective resilient legs while being fixed to an upper surface of the yoke or an upper surface of the weight, the fixing part having an opening perforated therethrough for exposing the upper surface of the yoke.

35. The vertical vibrator as set forth in claim 19, wherein the spring member is at least one plate spring comprising a fixing ring having an outer end fixed to an inner peripheral surface of the casing, a plurality of resilient legs connected at one end to the fixing ring for generating resilient force, and a fixing part connected to the other end of the respective resilient legs and having an opening perforated through the fixing part, the opening having an inner end fixed to an outer peripheral surface of the weight.

36. The vertical vibrator as set fourth in claim 19, wherein the spring member is at least one coil spring having an upper end fixed to a closed lower portion of the casing, and a lower end fixed to an upper surface of the yoke or an upper surface of the weight.

37. The vertical vibrator as set fourth in claim 19, wherein the vibration coil is provided on an upper surface of the bracket closing a lower portion of the casing.

38. The vertical vibrator as set fourth in claim 37, wherein the bracket is a substrate member having a terminal electrically connected to the vibration coil for supplying the power.

* * * * *